United States Patent [19]

Unger

[11] Patent Number: 4,854,884

[45] Date of Patent: Aug. 8, 1989

[54] TELEPHONE DISTRIBUTION FRAME CONNECTOR ASSEMBLY FOR USE WITH CENTRAL OFFICE PROTECTOR MODULE HAVING ALARM INDICATOR

[75] Inventor: John J. Unger, Elmhurst, Ill.

[73] Assignee: Reliance Comm/Tec Corporation, Chicago, Ill.

[21] Appl. No.: 202,226

[22] Filed: Jun. 3, 1988

[51] Int. Cl.[4] .............................................. H01R 4/66
[52] U.S. Cl. ....................................... 439/92; 439/94; 439/101; 439/620; 439/922
[58] Field of Search .................. 439/92, 94, 101, 620, 439/922; 361/119

[56] References Cited

U.S. PATENT DOCUMENTS 3,587,021 6/1971 Baumbach .............................. 337/32
4,701,135 10/1987 Volk et al. ........................ 439/922 X
4,808,116 2/1989 Unger et al. ........................... 439/94

OTHER PUBLICATIONS

Reliable Electric/Utility Products, Reliance Comm/-Tec Corporation—Catalog pp. A-300 and A-301 entitled "Connector Description", dated 1/82 and Catalog pp. A-305 and A-306 entitled "Resettable Heat Coil Modules", dated 1/82.

Primary Examiner—Eugene F. Desmond
Attorney, Agent, or Firm—Michael M. Rickin

[57] ABSTRACT

A frame connector assembly having a module field into which six pin alarm indicating modules can be inserted. The front face of the module field has six receptacles for each module, each receptacle associated with a respective one of the six module pins. The rear face of the module field has six pins for each module, each pin associated with a respective one of the six receptacles. The ground bus which interconnects all of the rear face ground pins of all of the modules in a given row follows a serpentine path. The module field receptacles are designed to make it difficult to insert a module with the pins reversed.

1 Claim, 5 Drawing Sheets

TELEPHONE DISTRIBUTION FRAME CONNECTOR ASSEMBLY FOR USE WITH CENTRAL OFFICE PROTECTOR MODULE HAVING ALARM INDICATOR

CROSS REFERENCE TO RELATED APPLICATIONS

Of interest are the following copending applications which are all filed on even date herewith and are all assigned to the same assignee as is the present application:

(1) Ser. No. 202,702, entitled "Central Office Protector Module With Alarm Indicator" based on the invention of R. Kaczmarek, which application discloses a central office protector module which may be used in the frame connector assembly of the present invention.

(2) Ser. No. 202,713, entitled "System For Providing Power To A Central Office Protector Module With Alarm Indicator And Including Remote Alarm Indication" based on the joint invention of P. Corvino and T. McCormick, which application discloses a system for among other things providing power to the alarm terminal of the connector assembly of the present invention.

BACKGROUND OF THE INVENTION

1. Field of the Invention

This invention relates to central office protector modules which provide an indication when either of the lines protected by the module are shorted to ground and more particularly to a telephone distribution frame connector assembly for use therewith.

2. Description of the Prior Art

Telephone distribution frame connectors, or panels as they are sometimes called, of the type having plug-in modules are generally known in the telephone art. In such connectors outside lines are connected to in-plant or central office switching equipment through protector modules which protect the inside equipment from damage due to overvoltage or overcurrent faults. These connectors or panels are mounted on distribution frames which are generally positioned close together. Space is often at a premium in such installations and accordingly, down-sizing or other space saving measures in the design of the connector assembly is a continuing objective.

A typical such connector assembly includes a module field which includes suitable connectors and terminals for receiving a plurality of overload protectors, a test field for receiving a test shoe to test the integrity of the connections, and an equipment field for terminating conductors from the inside plant equipment or central office switching equipment. The incoming lines are generally terminated either directly or through a cable stub to the terminals of the module field, which are respectively coupled to the appropriate terminals of receptacles which receive the respective overload protector modules. In this regard, a protector module is provided for each line pair being terminated in the module field. Accordingly, the protector modules are coupled between the incoming lines and the equipment field to provide a surge path to ground for the respective lines when an overvoltage fault or a current surge appears. In addition, the test field comprises a series of terminals coupled to the respective incoming lines. Thus, the connector assembly provides a protected interface between the incoming lines and inside plant lines and equipment, as well as providing a convenient place to test the various lines.

One example of such a connector assembly which meets current telephone operating requirements for minimizing connector assembly size and increasing protector module density is the R399 type assembly sold by assignee's Reliable Electric/Utility Products operating unit. A detailed description of that assembly may be obtained by referring to allowed U.S. patent application Ser. No. 008,055 entitled "Access Panel and Fanning Strip For Telephone Distribution Frame Connector Assembly" filed on Jan. 16, 1987 (now U.S. Pat. No. 4,752,249 which issued on June 21, 1988) which is assigned to the same assignee as is the present invention. A partial description of that assembly is given herein using several of the drawing figures and reference numerals used in the above identified application.

Figure 1:
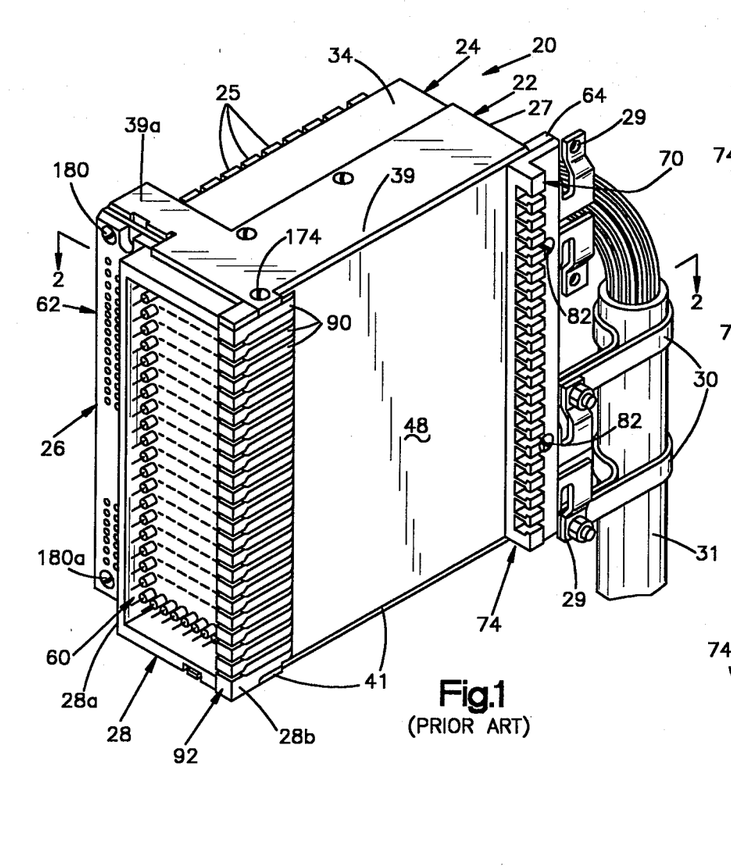
FIG. 1 is a front perspective view of a prior art frame connector assembly which has minimal size and increased module density.
Figure 2:
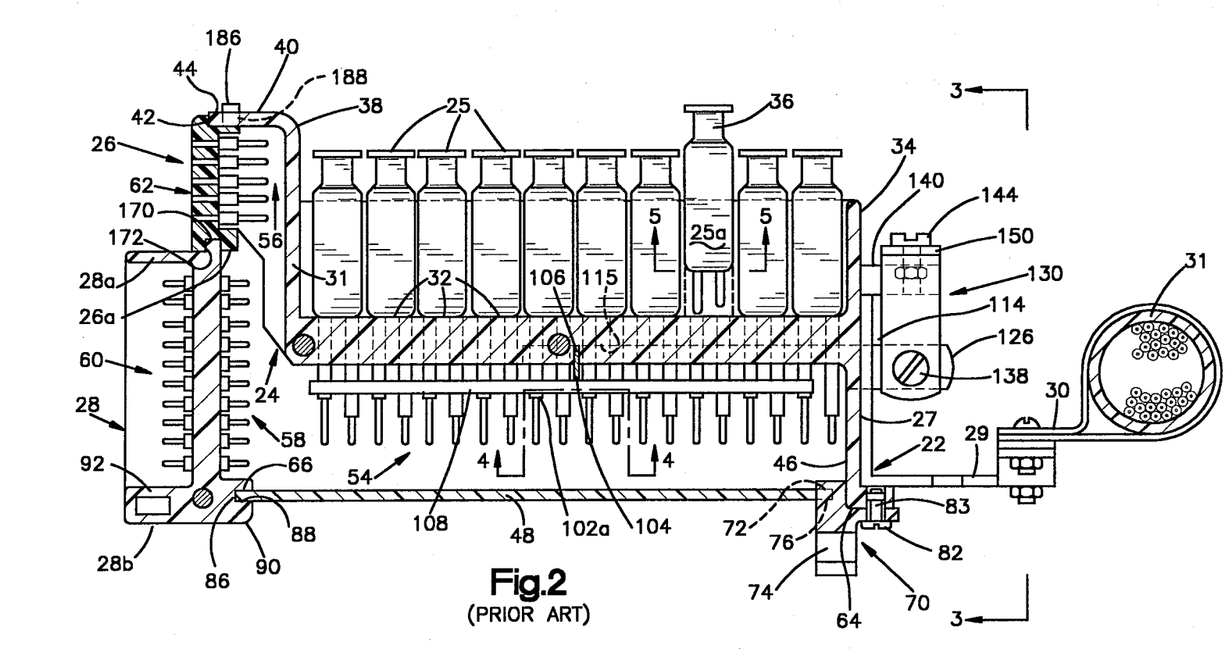
FIG. 2 is a development view taken along the line 2—2 of FIG. 1.

Referring now to FIG. 1 and FIG. 2, there is shown the above identified prior art connector assembly designated generally by the reference numeral 20. This assembly comprises a generally C-shaped frame member 22 which supports or mounts the remaining components of the assembly. In this regard, a module field block 24 mounts at an outer side thereof a plurality of prior art overvoltage or surge protector modules 25 which do not include the alarm indicator of the present invention. As will be seen later, each of these modules 25 receives an outside line and a corresponding line pair from inside telephone equipment or the like and provides a surge or discharge path to ground to protect the inside equipment from overvoltage or sudden current surges on the outside lines.

A test field block 26 and an equipment field block 28 are mounted in side-by-side condition to the frame member 22 and together define the front side of the assembly. A rear side of assembly is defined generally by a rear wall portion 27 of the frame member 22. This wall 27 supports outwardly extending ears or tabs 29 which may be utilized to mount suitable clamps 30 for receiving an incoming cable or cable stub 31. Others of these ears or tabs 29 are used to mount the entire assembly 20 to a telephone distribution frame (not shown), which receives a plurality of similar connector assemblies to form a distribution system.

In this regard, and referring also to FIG. 2, it will be seen that the module field block 24 includes receptacles 32 to mount or receive the protector modules 25. The opposite or inner side is provided with a plurality of terminals 54 corresponding respectively to the terminals of the modules 25, and is generally referred to in the art as the "back plane". The module field block also defines an upstanding peripheral wall portion 34 which surrounds the modules 25 on four sides. The modules 25 may be removed and inserted with respect to receptacles 32 by grasping outer ends 36 thereof as illustrated for the module 25a. It will be noted that the front side of the raised peripheral wall 32 of the module field block 24 is provided with an integral extension 38 which flares outwardly at generally a right-angle to form a side wall portion 40, further defining a portion of the left-hand side of the assembly 20. This side wall 40 terminates at an edge 42. A corresponding outwardly projecting shoulder portion or edge 44 of the test field block 26 abuts and overlies this edge 42.

It will also be noted that the module field block 24 also includes an additional or rear wall portion 46 which generally forms an extension of the rear portion of upstanding wall portion 34 and thus forms a rear wall of the assembly 20. It will be seen that the assembly thus far described generally defines an enclosure, with test field block 26 and equipment field block 28 forming a front side thereof, and module field block 24 forming a left-hand and rear side thereof. The top and bottom of this enclosure are defined respectively by symmetrical upper and lower side portions 39, 41 of the C-shaped frame member 22. In this regard, the upper side portion 39 is best viewed in FIG. 1, it being understood that the lower side portion 41 is substantially a mirror image thereof. The last, otherwise open, right side is normally covered by an access panel 48.

As previously indicated, each of the field blocks 24, 26 and 28 includes a plurality of terminals or connector members on an outer surface for receiving conductors or mating connectors. In this regard, the modules 25 mate with the connectors carried in the receptacles 32 of module field block 24.

Figure 3:
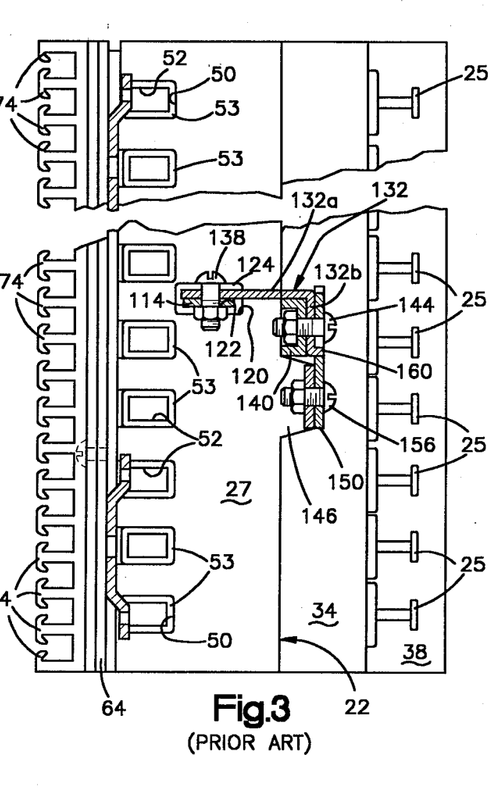
FIG. 3 is a rear view, partially in section of the assembly of FIG. 1, partially broken away and taken along the line 3—3 of FIG. 2.

Outside lines enter from the cable or stub 31 by way of a plurality of through aligned openings 50, 52 defined respectively in the rear side of the frame member 22, as best seen in FIG. 3. In this regard, it will be noted that the rear portion 27 of the frame member 22 overlies a major portion of the rear wall 46 of the module field block 24. Preferably, the openings 52 include raised peripheral lip portions 53 to facilitate alignment of the module field block with the frame. This arrangement also holds wires running therethrough away from the metal frame, to avoid possible abrasion or damage to the wires by the edges of the openings 50 of the metal frame.

As previously mentioned, these outside lines are connected to in-plant or central office switching equipment through the protector modules 25, and these connections are accomplished at selected terminals of the back plane, as designated generally by reference numeral 54. In this regard, additional terminals for the back plane wiring are also defined on the interior sides of the test field block 26 and the equipment field block 28, these latter terminals being respectively designated by general reference numerals 56 and 58.

In operation, the wiring is then carried from others of the terminals 54 to the desired terminals 58 of the equipment field block 28, the connections thereof to inside equipment being completed at the outer face thereof which bears corresponding terminals indicated generally by reference numeral 60. The terminals 56 of the test field block 26 are generally coupled to those terminals 54 which receive the incoming lines to permit a convenient place to test these various lines. In this regard, a suitable complementary test shoe (not shown) may be interfitted over the exterior of the test field block 26 to accomplish such testing.

It will be noted that the frame member top and bottom wall portions 39 and 41 overlie the top and bottom edge portions of panel 48 to complete the enclosure, these latter walls 39 and 41 being of relatively rigid metallic material, thereby insuring the integrity of the enclosure thus formed. In this regard, it will also be noted that the module field block 24, test field block 26 and equipment field block 28, as well as access panel 48 and hold-down strip 70 are all preferably formed, as by molding, from a suitable nonconductive material and preferably a relatively rigid and moldable plastic material.

Figure 4:
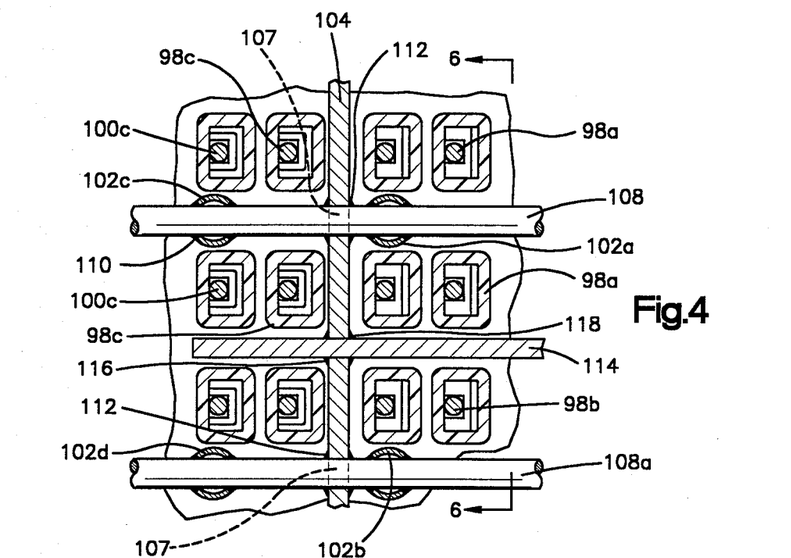
FIG. 4 is an enlarged fragmentary developmental view taken generally along the line 4—4 of FIG. 2.
Figure 5:
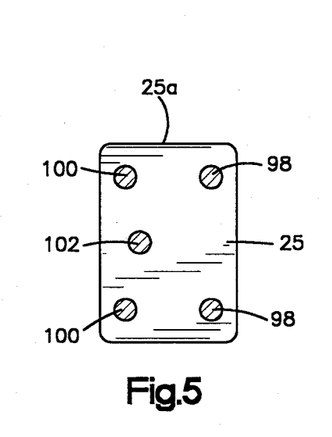
FIG. 5 is a bottom view of a single protector module, taken generally along the line 5—5 of FIG. 2.
Figure 6:
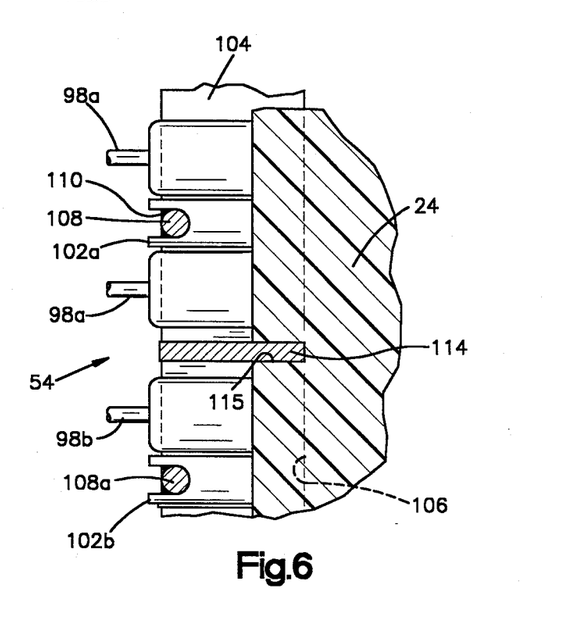
FIG. 6 is a view taken generally along the line 6—6 of FIG. 4.

Referring now to FIGS. 4 through 6 inclusive, the grounding arrangement for the connector assembly will next be described. Initially referring to FIG. 5, it will be seen that each of the protector modules 25 carries, at a bottom portion thereof, a plurality of terminal members. A first pair of these terminals 98 are for receiving an incoming line pair, while a second pair 100 are for receiving a corresponding line pair from the inside equipment. The remaining terminal 102 is designated as the ground terminal, through which any overvoltage or current surge condition is to be discharged or dissipated. Accordingly, and referring to FIG. 4, the rear or back plane side of module field block 24 includes corresponding groups of five terminals each which are here designated by like reference numerals 98, 100, 102, together with the respective suffixes a, b and c.

Advantageously, a ground bus means or system is provided for electrically interconnecting all of these ground terminals which are located interiorally of the enclosure defined by the assembled connector assembly, 20, that is, in the back plane 54. In the illustrated embodiment, the ground bus system includes a first, generally centrally disposed bus member or bus bar 104 of a predetermined cross-section, preferably equivalent to No. 6 AWG copper alloy solid wire size. This central conductor or ground bus 104 will be seen to run vertically and be generally centered with respect to the ground plane 54. The module field block 24 is preferably provided with a corresponding groove or slot 106 (see FIG. 6) to receive the first bus bar 104. This bus bar 104 is provided with a plurality of generally circular slots or openings 107 in its upper surface which in turn receive generally cylindrical bus bars or conductive rods 108.

These latter bus bars or conductive rods 108 are coupled directly to respective ground terminals 102a, 102b, etc., as by soldering as indicated, for example, generally at 110. These latter bus bars 108 are preferably No. 12 AWG copper alloy solid conductors. It will be noted with reference to FIG. 3 that a total of ten protector modules 25 are arranged in each horizontal row. Accordingly, and as required by industry standards, no more than five of these ground terminals 102a etc. are coupled to any given bus bar 108 before its junction with the larger center bus member 104. In this regard, the bars 108 are further coupled with the slots 107 which are formed to receive them in the rectangular center bus 104 by suitable means as by soldering as indicated generally at 112.

Advantageously, the ground bus system is carried exteriorally of the housing for grounding with the frame 22, which it will be remembered is mounted to a main distribution frame, which comprises what is known in the art as a "frame ground". Alternatively, as can be seen by referring to the above referenced patent application, a ground selecting means or assembly of the connector assembly permits the connector ground to be carried to some ground other than, or isolated from, this frame ground or what is generally known in the art as an "isolated ground".

Referring again to FIGS. 4 and 6, an additional bus bar member 114 is provided for carrying this ground connection exteriorally of the housing or enclosure defined by the assembled connector assembly. This latter bus bar 114 is also preferably equivalent in cross-section to No. 6 AWG copper alloy solid wire size. A groove or channel 115 is provided in the module field block 24 to receive this second bus bar 114. Advantageously, it is relatively simply interfitted with the similarly dimensioned center bus bar 104 by providing identical slots in each of the bus bars 104 and 114 in a substantially "T-shaped" configuration, this junction being indicated generally by reference numeral 116 in FIG. 4 and in FIG. 6. Additionally, this connection may be further secured as by soldering as also indicated at 118 in FIG. 4.

There has been increasing demand for a central office protector module which provides an indication when the module shorts either of the two lines protected by the module to ground. One example of such a module is that shown in U.S. Pat. No. 3,587,021 entitled "Line Protector For A Communications Circuit" which issued on June 22, 1971 and is assigned to the same assignee as is the present invention. The module shown therein includes a sixth or alarm pin which is connected to ground when a sustained overcurrent condition causes the module to ground either of the two lines protected by the module. Such a module is sold by assignee's Reliable Electric/Utility Products operating unit as the type R1104B module. That module plugs into a type 700 connector also sold by that same operating unit.

The type R1104B module while providing a visual indication of failure due to a sustained overcurrent condition does not provide a visual indication of failure due to a sustained overvoltage condition. In addition, the type 700 connectors are much larger and have a much smaller module density than frame connector assemblies of the R399 type. Therefore, operating companies have been expressing demand for a module which provides not only a visual indication when the module connects at least one of the two lines it is protecting to ground due to a sustained overcurrent or overvoltage condition, but also that a frame connector assembly having the size and increased module density of the R399 type assembly be useable with such modules.

SUMMARY OF THE INVENTION

A module field for a frame connector assembly. The module field has a front face and a rear face. There is at least one group of six receptacles in the front face. Each of the receptacles are for receiving an associated one of six pins of a protector module. There is at least one group of six terminals on the rear face. Each of the six terminals are associated with a respective of the six receptacles. The six terminals are arranged in two side-by-side clusters each having three terminals. The rear face also has a ground bar which follows a path around an outer edge of one of the clusters and in between the clusters to a connection with a middle one of the terminals in the other cluster.

DESCRIPTION OF THE DRAWING

FIG. 9 is an enlarged fragmentary developmental view taken generally along the line 9—9 of FIG. 8a.

DESCRIPTION OF THE PREFERRED EMBODIMENT

Figures 7A, 7B:
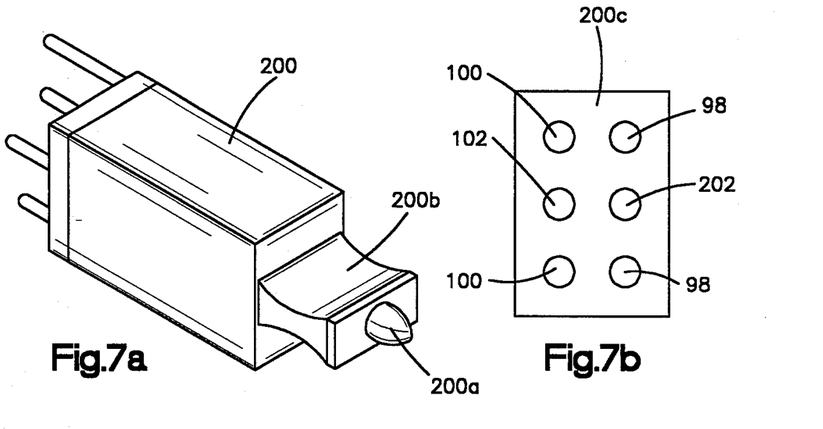
FIGS. 7a and 7b are a perspective and bottom view of a module which has a failure indicator.

Referring now to FIGS. 7a and 7b, there is shown a perspective and a bottom view, respectively, of a protector module 200 which has a means to indicate when either of the two lines protected by the module are shorted to ground. More particularly, as shown in FIG. 7a, module 200 has a light emitting diode (LED) 200a in the module's neck 200b. When either of the lines protected by module 200 are shorted to ground, the LED 200a is caused to light to thereby provide a visual indication.

As can be seen in FIG. 7b, protector module 200 has six terminal members or pins projecting outwardly from base 200c. This should be contrasted with modules 25 used in the described prior art connector assembly 20. Modules 25 have only five pins projecting outwardly from base 25a. As five of the six pins projecting outwardly from base 200c of module 200 are identical to the five pins projecting outwardly from base 25a of module 25, they have been given the same reference numbers used in FIG. 6 for the associated ones of the pins.

Module 200 has a sixth pin 202 which projects outwardly from base 200c. Pin 202 is known as the alarm pin and, in accordance with the present invention, is held at a relatively low amplitude positive voltage. Module 200 is designed such that when either of the two lines protected by the module are shorted to ground, the alarm pin is also shorted to ground. This connection to ground of pin 202 allows a current to flow to thereby light LED 200a.

A more detailed description of a particular embodiment for module 200 may be had by referring to the copending Ser. No. 202,702 application. A detailed description of a system for providing the relatively low amplitude voltage to pin 202 may be had by referring to the copending Ser. No. 202,713 application.

It should be clear that six pin module 200 cannot be inserted in connector assembly 20 without modifying that assembly. It should also be clear that modification requires that assembly 20 include a sixth terminal for receiving alarm pin 202. As can be seen in FIG. 4, that sixth terminal if added to connector assembly 20 would appear on the rear side of the module field 24 at the place where bus bar or conductive rod 108 is located. The sixth terminal must, however, receive the relatively low amplitude positive voltage. Therefore, it is necessary to not only modify connector assembly 20 so as to include a sixth terminal for receiving alarm pin 202, but also to further modify assembly 20 so as to change the routing of bus bar 108. In addition to the above modifications, it is desirable to further modify assembly 20 to make it difficult for a craftsperson to insert a module 200 into the module field of the present invention with pins 98, 202, 98 going into the receptacles for pins 100, 102, 100 respectively, and vice versa. Inserting module 200 into the field in this manner completely defeats the alarm indicating feature of module 200 as the relatively low amplitude positive voltage is on the module's ground pin 102 rather than alarm pin 202.

Figure 8A:
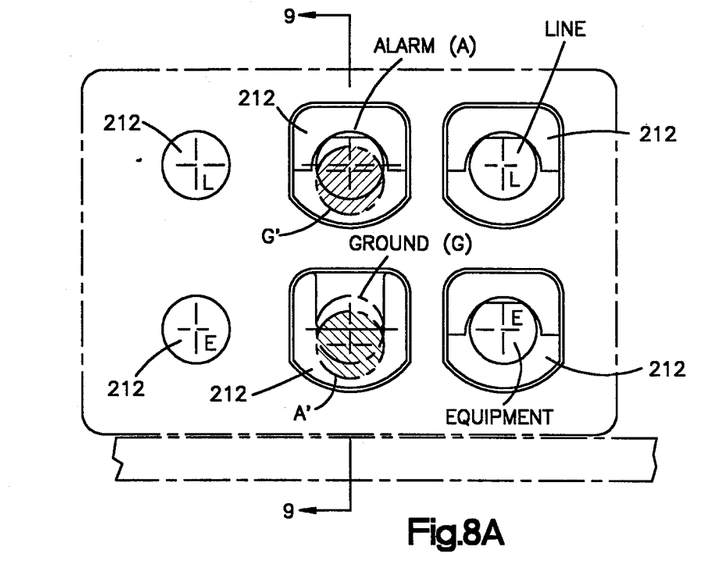
FIGS. 8a and 8b are a front and rear view of a module field embodied in accordance with the present invention.

As the only difference between prior art connector assembly 20 and the connector assembly of the present invention is essentially in the module field, it is necessary to only describe that field. To that end, there is shown in FIG. 8a a front view of a module field 210 embodied in accordance with the present invention and in FIG. 8b a rear view of the same module field. For ease of description the front view of field 210 shows the field without any of the modules 200 inserted therein. In addition, for ease of illustration and description, only the receptacles 212 for receiving one of the modules 200 is shown in FIG. 8a. It should be appreciated that field 210 is typically designed to accept 100 of modules 200 arranged in ten rows of ten modules each.

As was described in connection with FIG. 7b, module 200 has six pins which project outwardly from base 200c. The two pins 98 are the pins associated with the incoming line pair and the associated ones of the receptacles 212 are each designated by the letter "L." The two pins 100 are the pins associated with the equipment line pair and the associated ones of the receptacles 212 are each designated by the letter "E." Pin 102 is associated with ground and the associated one of receptacles 212 is designated by the letter "G." Pin 202 is associated with the alarm and the associated one of receptacles 212 is designated by the letter "A."

The openings of the receptacles are essentially circular in cross section. As has been previously described, the pins 100, 102, 100 of module form a first group of pins which are almost symmetrical about center line 200d with the second group of pins formed by pins 98, 202, 98. The asymmetry about center line 200d results from the asymmetry between ground pin 102 and alarm pin 202. This asymmetry provides a first means for preventing a craftsperson from inserting module 200 into receptacles 212 with the pins reversed.

The ability of this asymmetry to prevent a reverse insertion of module 200 is illustrated in FIG. 8a, by the dotted circle designated as G' which is superimposed over the opening of receptacle A and the dotted circle designated as A' which is superimposed over the opening of receptacle G. The circle G' represents the opening that receptacle A would have to have in order to easily accept ground pin 102. The circle A' represents the opening that receptacle G would have to have in order to easily accept alarm pin 202. Thus, it can be seen from FIG. 8a that if a craftsperson attempts to insert module 200 into receptacles 212 in a reverse manner, the module will not be easy to so insert. The asymmetry in the alarm and ground pins about the center line of the module's base will require the craftsperson to exert substantially more downward force to seat the module than ordinarily has to be exerted if the module was not reversed prior to insertion.

Figure 8B:
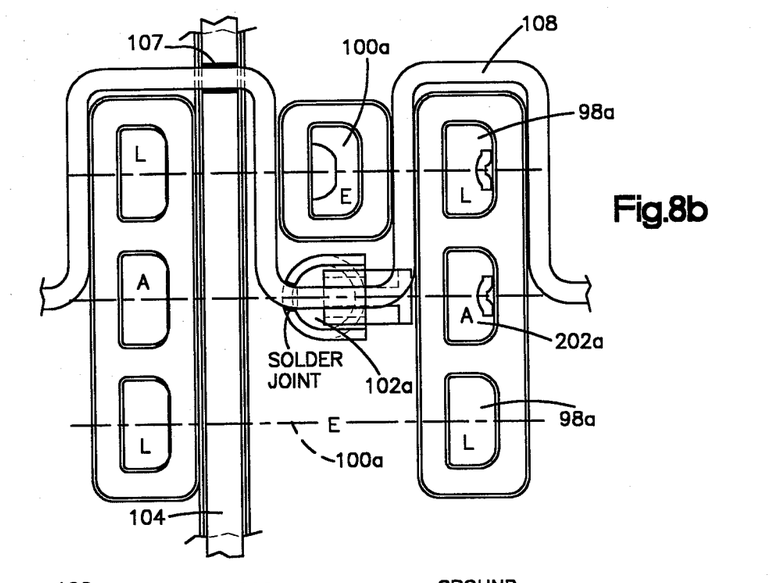

Referring now to FIG. 8b, there is shown a rear view of module field 210. For ease of description and illustration, the rear view of field 210 shows the field only with the terminals associated with one of the modules 200. In particular, the terminals shown are those for a module 200 which is just to the right of centrally located ground bus bar 104. As was described for prior art connector assembly 20, bus bar 104 is generally centrally disposed on the rear of the module field and is a predetermined cross-section, preferably No. 6 AWG copper alloy solid wire size.

The terminals for that module are designated by the same reference numerals 98, 100, 102, 202 as those used for the pins of module 200 together with the suffix a, i.e., terminal 202a corresponds to alarm pin 202, terminal 102a corresponds to ground pin 102; the two terminals 98a correspond to the two line pins 98 and the two terminals 100a corresponds to the two equipment pins 100. In addition, the line terminals 98a are also designated by the letter "L"; the equipment terminals 100a are also designated by the letter "E," the ground terminal 102a by the letter "G" and the alarm terminal 202a by the letter "A."

As was previously discussed, the addition of alarm terminal 202a has made it necessary to change the routing of ground bus bar 108 from that shown in FIG. 4. The bus bar 108 must be coupled to ground terminal 102a. It must also be coupled to the ground terminals of the nine other modules which are in the same horizontal row as the module for which the terminals are shown in FIG. 8b. As can be seen in FIG. 8b, bus bar 108 is routed to "snake" around the line and alarm terminals 98a and 202a of the module in order to allow for the alarm terminal. Bus bar 108 of the assembly of the present invention may be referred as the "serpentine" ground in order to distinguish it from the straight ground of prior art connector assembly 20.

The serpentine ground bar 108 is connected directly to ground terminal 102a as well as the ground terminals of all of the other modules in the same horizontal row as indicated, for example, generally at 110. The serpentine ground bars 108 are preferably No. 12 AWG copper alloy solid conductors. As with connector assembly 20, no more than five of the ground terminals of the modules in any given horizontal row of module field 210 are coupled to the associated serpentine bus bar 108 before the junction of that bar with the larger center bus member 104. Bus member 104 has slots 107 by which serpentine ground bar 108 is coupled to bar 104 by suitable means such as by soldering.

While not shown in FIG. 8b, module field 210 also includes an additional bus bar member to carry the ground connection exteriorally of the housing or enclosure defined by the connector assembly. This latter bus bar may be the same as bus bar 114 of prior art assembly 20 (see FIG. 4).

Figure 9:
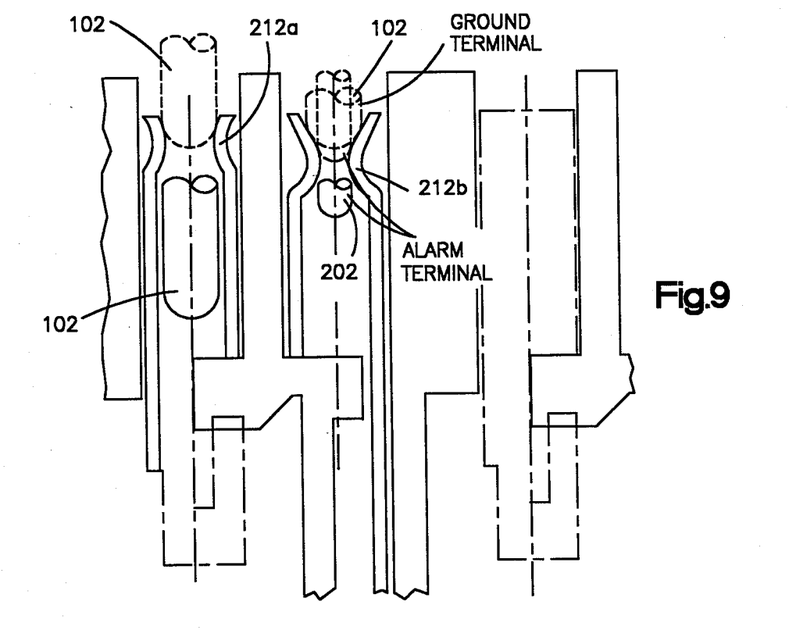

There has been described in connection with FIG. 8a, a first means for preventing a craftsperson from inserting a module 200 into receptacles 212 with the pins reversed. Referring now to FIG. 9, there is shown a cross-section taken through the A and G receptacles 212. This cross-section shows a second means for preventing a craftsperson from inserting a module 200 into receptacles 212 with the pins reversed.

Each of the A and G receptacles has a circular opening. Both receptacles have a conductor with a circular cross-section inserted therein. That conductor has a portion which is smaller in diameter than the diameter of the opening. For the G receptacle, this portion is designated as 212a whereas for the A receptacle, it is designated as 212b. As can be seen from FIG. 9, the diameter of portion 212b is considerably less than the diameter of portion 212a.

The ground pin 102 of module 200 has a larger diameter than alarm pin 202. In one embodiment for module 200, the diameter of the ground pin 102 was 0.093 inches (about 2.4 mm) whereas the diameter of the alarm pin was 0.060 inches (about 1.5 mm). The smaller opening of portion 212b of the A receptacle will easily accept the alarm pin 202. It will not easily accept the much larger diameter ground pin 102. Thus, by designing the diameter of the portion 212b of the A receptacle to be smaller than the diameter of the ground pin 102 a second means has been provided to prevent a craftsperson from inserting a module 200 into receptacles 212 of field 210 with the pins reversed.

It is to be understood that the description of the preferred embodiment is intended to be only illustrative, rather than exhaustive, of the present invention. Those of ordinary skill will be able to make certain additions, deletions and/or modifications to the embodiment of the disclosed subject matter without department from the spirit of the invention or its scope, as defined by the appended claims.

What is claimed is:

1. A module field for a frame connector assembly comprising:

(a) a front face;
(b) a rear face;
(c) at least one group of six receptacles in said front face, each of said receptacles for receiving as associated one of six pins of a protector module;
(d) at least one group of six terminals on said rear face, each of said six terminals associated with a respective one of said receptacles, said six terminals arranged in two side-by-side clusters each having three of said terminals; and
(e) grounding means in said rear face, said grounding means following a path around an outer edge of one of said clusters and in between said clusters to a connection with a middle one of said terminals in the other of said clusters.

* * * * *